Feb. 23, 1960     M. J. LIESER     2,925,828
BALANCED THREE-WAY VALVE
Filed Aug. 30, 1955
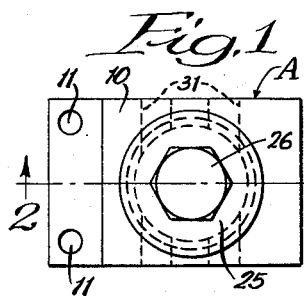
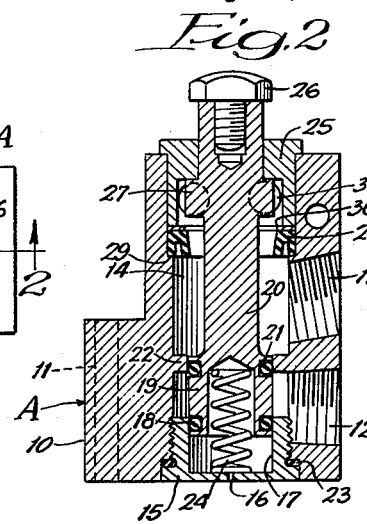
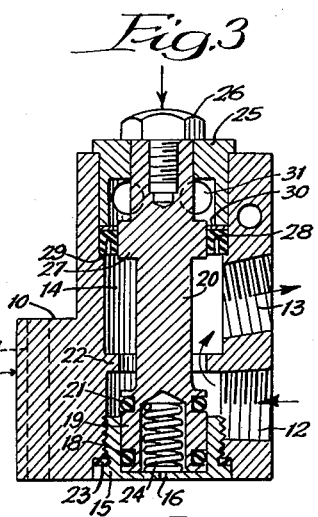
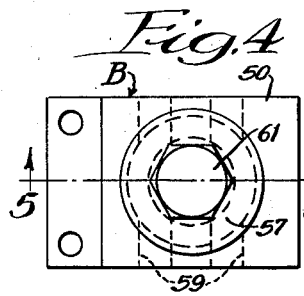
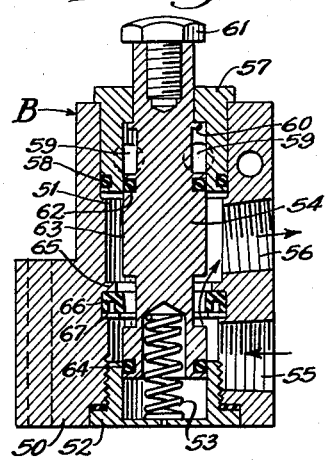
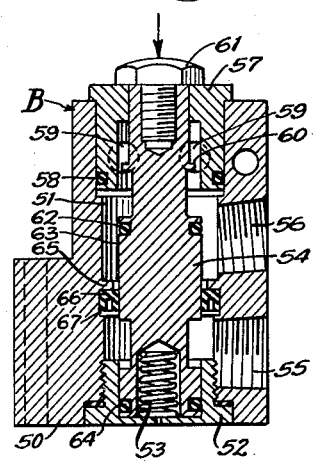
INVENTOR:
Mathias J. Lieser,
BY
Dawson Tilton & Graham,
ATTORNEYS.

United States Patent Office

2,925,828
BALANCED THREE-WAY VALVE
Mathias J. Lieser, Chicago, Ill., assignor to Mead Specialties Company, Inc., Chicago, Ill., a corporation of Illinois Application August 30, 1955, Serial No. 531,504

7 Claims. (Cl. 137—620)

This invention relates to a valve structure, and more particularly to a balanced three-way valve. The invention has utility in fluid flow lines as, for example, fluid pressure actuated machinery wherein it is desired to selectively deliver fluid under pressure through the line, terminate the flow of fluid therethrough, and exhaust the line downstream of the valve.

An object of this invention is to provide a three-way valve that is substantially balanced or independent of the pressure of the fluid flowing therethrough, whereby substantially the same force can shift the valve between open and closed positions irrespective of whether the line pressures are high or low. Another object of the invention is in providing a three-way valve wherein free over-travel is afforded in the movement of the valve stem from its normally operative position to its alternate operative position, an advantage especially where valves are cam-actuated. Still another object is that of providing a three-way valve structure having no seals at the bearing sections thereof, and wherein sealing of the bearing sections occur before movement of the valve stem from one position to another has terminated.

A further object is to provide a valve structure of the character described wherein the stem is easily and readily removed for repair and replacement, and in which an inlet and outlet opening are full-size—that is, not restricted, as in conventional valves of the three-way type wherein the inlet and outlet ports communicating with the valve chamber must be substantially reduced in size from that of the fluid flow conduits because of the over-all size limitations of the valve, and because the valve stem must move within the limits defined by the ports. Additional objects and advantages will appear as the specification develops.

Embodiments of the invention are illustrated in the accompanying drawing, in which:

Figure 1 is a top plan view of one embodiment of the invention; Figure 2 is a vertical sectional view taken along the line 2—2 of Figure 1; Figure 3 is a vertical sectional view similar to that of Figure 2, but showing the valve stem in an alternate position; Figure 4 is a top plan view of a modified form of the invention; Figure 5 is a vertical sectional view taken along the line 5—5 of Figure 4; and Figure 6 is a vertical sectional view similar to that of Figure 5, but showing the valve stem in an alternate operative position.

The form of valve structure illustrated in Figures 1 through 3 is designated generally with the letter A, and is a normally closed three-way valve. This valve comprises a casing 10 having at one side thereof a pair of ports 11 extending vertically therethrough that are adapted to receive cap screws for securing the casing to a suitable piece of support apparatus. The casing 10 is provided with an inlet port 12 and an outlet port 13, each of which is threaded for receiving the fittings of flow conduits in circuit in which the valve is inserted. The casing 10 also has a central valve chamber 14 that extends longitudinally therethrough, or vertically as the valve is illustrated in Figures 2 and 3.

The lower end of the chamber 14 is threaded, and is adapted to threadedly receive therein a closure plug 15 having a central opening or exhaust aperture 16. The inner cylindrical surface 17 of the closure plug is finished so as to provide a sealing engagement with a seal member or O-ring 18 carried within an annular channel provided by a lower enlarged section or valve section 19 of the valve stem 20. This enlarged section 19 also provides a second annular channel that receives and supports therein an O-ring or seal member 21 that is adapted to provide a sealing engagement with a land 22 extending inwardly from the walls of the chamber 14. The O-rings 18 and 21 are spaced apart longitudinally with respect to the chamber 14, and with respect also to the valve stem 20. Preferably, a seal 23 is provided about the closure member 15 to prevent the escape of high pressure fluid that flows downwardly between the mating threads of the chamber and closure member from the inlet port 12.

The lower end of the valve stem 20 within the enlarged section 19 thereof is provided with a passage within which seats a coil spring 24, the opposite end of which seats against the bottom wall of the closure member 15. The spring biases the stem 20 upwardly into the position shown in Figure 2, which is the normal or closed position of the valve.

Inserted within the upper end of the chamber 14 is a bearing member 25 that may be secured within the chamber by means of a press fit. The bearing member 25 has a central passage extending therethrough that provides the bearing support through which the upper end of the stem 20 is reciprocable. Preferably, the upper end of stem 20 has a threaded opening therein for receiving a cam follower 26 if the valve is to be cam-actuated, or alternatively, an enlarged button or knob that will enable the stem to be depressed by hand.

The section within the bearing member 25 of the stem 20 is enlarged (as shown at 27) and this enlarged section, when the stem is in its uppermost position (as shown in Figure 2) abuts the top wall of the bearing member 25 and limits upward movement of the stem under the biasing forces exerted thereon by the coil spring 24. This enlarged section is a valve adapted to sealingly engage and form a fluid-tight seal with the annular inverted U-shaped seal member 28 that is held in the position shown by a seat 29 provided along the wall of the chamber 14 and by a support washer 30 that engages the top surface of the seal member and is forced into tight engagement therewith by the depending cylindrical wall of the bearing member 25. The bearing member 25 is provided with a plurality of spaced apart exhaust ports 31 that communicate with aligned flow ports in the casing 10 that together provide a flow communication between the chamber 14 and the exterior of the casing.

In operation of this form of the valve structure, it is apparent that normally the valve is closed and is in the position shown in Figure 2. At this time, the O-ring seal member 21 sealingly engages the inner surface of the land 22, while the O-ring 18 sealingly engages the surface 17 of the closure plug 15. Therefore, fluid present at the inlet port 12 cannot flow to the outlet port 13 of the valve. At the same time, the outlet port 13 is in open communication with the exhaust ports 31 so that the downstream side of the fluid flow line is exhausted to atmosphere.

When the valve is to be opened, a downward force is applied to the cam button 26, with the result that the biasing force of spring 24 is overcome and the stem is shifted to the downward position illustrated in Figure 3. At this time, open communication is provided between the inlet port 12 and outlet port 13 through the valve chamber 14. However, the enlarged valve section 27 of the stem is in engagement wtih the seal member 28, and the fluid-tight seal that results therefrom isolates the exhaust ports 31 and prevents the flow of pressure fluid thereto. The valve may be maintained in the open position so long as the downward forces applied to the cam button or cam follower 26 exceed the biasing force of the spring 24 which may, for example, be in the area of about nine pounds.

The valve structure provides for movement of the stem 20 independently of the pressure of the fluid appearing at the inlet port 12 and that flows through the valve structure. It will be noted that initially, when the valve is in the position shown in Figure 2, the aperture 16 permits atmospheric pressure to bear upwardly against the under end of the stem 20, while atmospheric pressure also bears downwardly on the cam button 26 and downwardly on the upper end of the enlarged lower section 19 of the stem, for at that time the chamber 14 is at atmospheric pressure through its communication with the exhaust ports 31. The only force necessary then to push the valve stem downwardly is a force of sufficient magnitude to overcome the biasing action of the spring 24.

On the other hand, when the valve is open as shown in Figure 3, fluid pressure within the chamber 14 bears upwardly on the underside of the enlarged valve section 27 and downwardly against the upper end of the lower enlargement 19. The opposite ends of the stem are at atmospheric pressure so that the only forces of any consequence acting on the stem are the biasing force of the spring and the applied downward forces exerted against the cam button 26. Therefore, the valve structure functions independently of the fluid pressures associated therewith, and to shift the valve from closed to open position only the spring force need be overcome.

Further, free over-travel of the stem 20 is permitted in that the enlarged valve section 27 effectuates a seal with the seal member 28 upon initial engagement therewith, and this sealing engagement continues while the stem is shifted to its lowermost position. At the same time, the valve is opened as soon as the O-ring seal member 21 breaks engagement with the land 22. The actuating mechanism then, such as a cam used to engage the cam follower 26 and shift the stem downwardly, need not be critically adjusted since it may work within a range of movement, the range being defined by the lowermost position of the stem 20 and the other open position of the stem which is not so small that a substantial pressure drop through the chamber 14 is encountered. Free over-travel is of importance for it is difficult to provide cam members that are dimensionally accurate, etc. without increasing the cost of an installation.

The form of structure shown in Figures 4 through 6 is designated generally with the letter B, and is a normally open three-way valve. In many respects, the normally open valve is similar to the normally closed valve heretofore described in detail. As a result thereof, the valve structure B will not be described with the same degree of detail except where the structure differs in important respects.

The normally open valve structure B comprises a casing 50 having a valve chamber 51 extending therethrough that is threaded at its lower end to receive a closure plug 52 that provides a seat for a coil spring 53 that is received within and bears upwardly against a valve stem 54. The casing is provided with an inlet port 55 communicating with the chamber 51, and also with an outlet port 56 in open communication with the valve chamber.

At its upper end, the chamber 51 is closed by a bearing member 57 that may be pressed into the chamber, and a fluid-tight seal is provided therebetween by a static O-ring seal 58. The bearing member 57 is provided with a plurality of exhaust ports 59 adapted to communicate with the valve chamber 51 and to exhaust the same to atmosphere through aligned flow passages in the casing 50.

The stem 54 is equipped with an annular shoulder 60 adjacent the upper end thereof that limits upward movement of the stem through engagement with the top wall of the bearing member 57. A cam follower 61 is removably carried by the stem and is adapted to have a downward force applied thereagainst to shift the valve between the position shown in Figure 5 and that shown in Figure 6. An O-ring seal 62 effectuates a sealing engagement between the enlarged central section 63 of the valve stem and the depending annular wall of the bearing member 57. At its lower end, the stem carries an O-ring seal 64 adapted to sealingly engage the inner annular walls of the closure plug 52.

Intermediate the ends of the chamber 51, a generally U-shaped seal member 66 is provided that is held in place between a shoulder 65 provided by the valve casing and a washer 67.

As has been brought out hereinbefore, the stem 54 is normally maintained in the upward position shown in Figure 5 by the biasing force exerted thereagainst through the coil spring 53. In this position of the valve, the inlet port 55 communicates through the valve chamber 51 with the outlet port 56. At the same time, the seal member 62 isolates the exhaust ports 59 so that no pressure fluid escapes therethrough.

When it is desired to close the valve, a downward force is applied against the cam button 61 to shift the valve stem toward the position shown in Figure 6. At this time, the seal 62 moves downwardly from its sealing engagement with the walls of the bearing member 57, and the chamber 51 is in open communication with the exhaust ports 59, thereby reducing to atmospheric pressure the flow line downstream of the valve. The enlarged valve section 63 of the stem, however, is in engagement with the U-shaped seal member 66 and effectuates a fluid-tight seal therewith. Therefore, pressure fluid cannot flow from the port 55, thereby, and to the outlet port 56. The O-ring seal 64 prevents the escape of pressure fluid from the lower end of the valve structure.

In this form of the valve structure, the stem is balanced, and the only force required to shift the valve to closed position is that which will overcome the magnitude of the spring 53. Also, the stem is afforded free over-travel because of the functioning of the enlarged valve section 63 and U-shaped seal member 66. In the normally closed valve A, and normally open valve B, it may be noted that there are no seals at the bearing surfaces of the stems as, for example, between the bearings 25 or 57 and the portions of the valve stems reciprocable therethrough. This is a decided advantage for the customary wear of seal members is obviated. Further, the stem of each form of valve structure may be quickly and easily removed where repair or replacement is required, simply by removing the end closure plugs 15 or 52.

While in the foregoing specification embodiments of the invention have been disclosed in considerable detail for purposes of adequately describing the invention, it will be apparent to those skilled in the art that numerous changes may be made in those details without departing from the spirit and principles of the invention.

I claim:

1. In a three-way valve structure, a casing having a longitudinal bore extending therethrough and having inlet and outlet ports near one end of the bore and an exhaust port communicating with another end of said bore, sealing means in said bore between said inlet and outlet port and between said outlet port and said exhaust port, a bearing member received in one end of said bore and having an elongated bearing surface adapted to receive a valve stem, said member providing a seal for said bore spaced inwardly of said elongated bearing surface, a valve stem received within said bearing member and guided thereby within said longitudinal bore, enlargements carried by said stem engageable with said sealing means to open and close said valve, a removable closure cap secured within the end of said bore opposite said bearing member and providing a sleeve adapted to receive sealing means carried by the stem, and a spring within said sleeve and engaging said closure and having its other end engaging said stem to bias it toward one limit of its movement, said closure cap being apertured to admit air into the sleeve thereof.

2. The structure of claim 1 in which one of said sealing means comprises an annular U-shaped seal member.

3. In a three-way valve structure, a casing provided with a longitudinal bore and having a bearing member closing one end thereof and a removable closure plug closing the other end thereof, said bearing member being provided with a longitudinal bearing surface for receiving a valve stem, a valve stem guided by said bearing surface for longitudinal movement in said bore and being provided with spaced sealing members, said bore having at one end thereof exhaust ports and in spaced relation therefrom an inlet port and an outlet port, said sealing means carried by said stem being effective for closing flow from said inlet to said outlet port while establishing communication between said outlet port and said exhaust ports, said closure plug being provided with an inwardly-extending sleeve adapted to receive an end portion of said stem and sealing means carried thereby, and a spring within the sleeve of said plug and with one end resting upon the bottom of said plug and the other end engaging said stem to bias said stem toward one limit of its movement, said closure plug being apertured, the sealing means carried by said stem adjacent said exhaust ports to isolate said exhaust ports from said outlet port, forming an elongated sliding seal as the stem is moved toward a position opening the passage between the said inlet port and outlet port.

4. In a balanced three-way valve, a casing having a longitudinal bore extending therethrough, inlet and outlet ports in said casing communicating with said bore intermediate the ends thereof, a bearing member received in the end of said bore adjacent the said outlet port and having an elongated bearing surface adapted to receive a valve stem, a valve stem received within said bearing member and guided thereby during reciprocation of said valve stem within said longitudinal bore by force exerted from outside said bearing member, enlargements carried by said stem and said bore intermediate the said inlet and outlet ports and spaced inwardly of said elongated bearing surface, one of which is equipped with resilient sealing means whereby said inlet port is adapted to be isolated from said outlet port, exhaust port means in said bearing member, sealing means between said outlet port and said exhaust port provided by the cooperation of said stem and said bearing member, one of which is provided with resilient sealing means, said sealing means being operative to communicate said exhaust port means and said outlet port whenever said inlet port is isolated from said outlet port, the other end of said bore being closed with a removable cap member and providing a sleeve adapted to receive sealing means carried by said stem, a spring within said sleeve and engaging said cap member and having its other end engaging said stem to bias it to a position whereby a portion extends out of said bearing member to present a stem surface against which force can be applied, said cap member being apertured to admit air into the sleeve thereof, said last-mentioned sealing means being continually operative to isolate said inlet port and the aperture of said cap member irrespective of the position of said stem.

5. The structure of claim 4, in which the said last-mentioned sealing means is an O-ring mounted in an annular recess in said stem adjacent the end thereof and said cap member is threadedly received in said bore.

6. The structure of claim 4, in which the said enlargements are elongated in the direction of travel of said stem, whereby an elongated sliding seal is formed between said enlargements.

7. In a balanced three-way valve, a casing having a longitudinal bore extending therethrough, inlet and outlet ports in said casing communicating with said bore intermediate the ends thereof, a bearing member received in the end of said bore adjacent the said outlet port and having an elongated bearing surface adapted to receive a valve stem, a valve stem received within said bearing member and guided thereby during reciprocation of said valve stem within said longitudinal bore by a force exerted from outside said bearing member, said stem having an end accessible from outside said bearing member for application of said force, an enlargement carried by said stem spaced inwardly of said elongated bearing surface and an enlargement carried by said bore intermediate the said inlet and outlet ports, one of said enlargements being equipped with resilient sealing means whereby the said inlet port is adapted to be isolated from the said outlet port, exhaust port means in said bearing member, sealing means between said outlet port and said exhaust port provided by the cooperation of said stem and said bearing member one of which is provided with resilient sealing means, said sealing means being operative to communicate said exhaust port means and said outlet port whenever said inlet port is isolated from said outlet port, the other end of said bore being closed with a removable cap member and providing a sleeve adapted to receive sealing means carried by said stem, a spring within said sleeve and engaging said cap member with one end thereof, said spring having its other end engaging said stem to bias it to a position in which said stem and bore enlargements are offset to communicate said inlet and outlet ports, said cap member being apertured to admit air into the sleeve thereof, the last-mentioned sealing means being continually operative to isolate said inlet port and the aperture of said cap irrespective of the position of said stem.

References Cited in the file of this patent

UNITED STATES PATENTS

| Number | Name | Date |
|---|---|---|
| 173,653 | Locke | Feb. 15, 1876 |
| 1,211,042 | Baird | Jan. 2, 1917 |
| 1,381,315 | Laussucq | June 14, 1921 |
| 1,540,962 | Stuart | June 9, 1925 |
| 2,094,926 | Nutter | Oct. 5, 1937 |
| 2,564,686 | Gray | Aug. 21, 1951 |
| 2,638,108 | Williams | May 12, 1953 |
| 2,705,020 | Frantz | Mar. 29, 1955 |
| 2,710,597 | Ineichen | June 14, 1955 |
| 2,713,989 | Bryant | July 26, 1955 |
| 2,722,946 | Mueller | Nov. 8, 1955 |

FOREIGN PATENTS

| Number | Country | Date |
|---|---|---|
| 22,747 | Great Britain | Nov. 28, 1895 |
| 623,698 | Great Britain | of 1949 |